(12) United States Patent
Ouchi

(10) Patent No.: US 10,218,948 B2
(45) Date of Patent: Feb. 26, 2019

(54) IMAGE DISPLAYING SYSTEM, CONTROLLING METHOD OF IMAGE DISPLAYING SYSTEM, AND STORAGE MEDIUM

(71) Applicant: CANON KABUSHIKI KAISHA, Tokyo (JP)

(72) Inventor: Akihiro Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,679

(22) Filed: Dec. 7, 2015

(65) Prior Publication Data

US 2016/0165198 A1  Jun. 9, 2016

(30) Foreign Application Priority Data

Dec. 8, 2014  (JP) ................. 2014-248332

(51) Int. Cl.
*H04N 9/31* (2006.01)
*G06K 9/46* (2006.01)
(Continued)

(52) U.S. Cl.
CPC ......... *H04N 9/3182* (2013.01); *G06K 9/4652* (2013.01); *G06K 9/4661* (2013.01);
(Continued)

(58) Field of Classification Search
CPC .. H04N 9/3182; H04N 9/3147; H04N 9/3194; G06T 7/408; G06T 11/60; G06K 9/4652; G06K 9/4661
(Continued)

(56) References Cited

U.S. PATENT DOCUMENTS

2001/0024326 A1* 9/2001 Nakamura ........... G02B 26/125
                                                        359/618
2002/0008697 A1* 1/2002 Deering ............... G06T 5/006
                                                        345/418
(Continued)

FOREIGN PATENT DOCUMENTS

JP  2002238064 A  8/2002
JP  2007225694 A  9/2007
(Continued)

OTHER PUBLICATIONS

Office Action issued in Japanese Application No. 2014-248332 dated Sep. 11, 2018. English translation provided.

*Primary Examiner* — Paulos M Natnael
*Assistant Examiner* — Sean N. Haiem
(74) *Attorney, Agent, or Firm* — Rossi, Kimms & McDowell LLP

(57) ABSTRACT

It aims to enable to uniform synthesized luminance in an image overlap region of a projection image by a simple process, by means of a mechanism of: performing display control to project a black image as the projection image to be projected from a first projection-type image displaying apparatus to a screen, and project, as the projection image to be projected from a second projection-type image displaying apparatus to the screen, an image in which dimming correction to the overlap region of the projection images respectively projected by the first and second projection-type image displaying apparatuses has been enabled; measuring a luminance characteristic of the second projection-type image displaying apparatus based on a photographed image obtained by photographing the overlap region; and setting a dimming correction characteristic for the overlap region by the first projection-type image displaying apparatus, based on the measured luminance characteristic.

11 Claims, 11 Drawing Sheets

(51) Int. Cl.
*G06T 7/40* (2017.01)
*G06T 11/60* (2006.01)

(52) U.S. Cl.
CPC ........... *G06T 11/60* (2013.01); *H04N 9/3147* (2013.01); *H04N 9/3194* (2013.01)

(58) Field of Classification Search
USPC ................... 348/744, 745, 383; 353/34, 30; 359/618; 345/589, 581, 647, 418
See application file for complete search history.

(56) References Cited

U.S. PATENT DOCUMENTS

| | | | | |
|---|---|---|---|---|
| 2002/0012004 A1* | 1/2002 | Deering | ................ | G06T 3/0081 345/589 |
| 2002/0015052 A1* | 2/2002 | Deering | ................ | G06T 3/0081 345/647 |
| 2002/0070944 A1* | 6/2002 | Deering | ................ | G06T 3/0081 345/581 |
| 2003/0206179 A1* | 11/2003 | Deering | ................ | G06T 3/0081 345/589 |
| 2004/0085477 A1* | 5/2004 | Majumder | ................ | H04N 9/12 348/383 |
| 2007/0058140 A1* | 3/2007 | Kobayashi | ............. | G03B 21/26 353/94 |
| 2007/0291047 A1* | 12/2007 | Harville | ................ | G06F 3/1446 345/589 |
| 2007/0291185 A1* | 12/2007 | Gelb | .................... | H04N 9/3147 348/745 |
| 2007/0291189 A1* | 12/2007 | Harville | ................ | G06F 3/1423 349/7 |
| 2007/0291233 A1* | 12/2007 | Culbertson | .......... | H04N 9/3194 353/34 |
| 2014/0313423 A1* | 10/2014 | Johnson | ................ | G03B 21/13 348/745 |
| 2014/0354674 A1* | 12/2014 | Okamoto | ................ | G09G 5/02 345/590 |
| 2015/0029465 A1* | 1/2015 | Ishikawa | ................ | G06T 3/005 353/30 |
| 2016/0191914 A1* | 6/2016 | Kim | ...................... | H04N 5/265 348/177 |
| 2016/0309129 A1* | 10/2016 | Ohsawa | ................ | H04N 9/3191 |

FOREIGN PATENT DOCUMENTS

| | | |
|---|---|---|
| JP | 2007295026 A | 11/2007 |
| JP | 2009014951 A | 1/2009 |
| JP | 2013247601 A | 12/2013 |

* cited by examiner

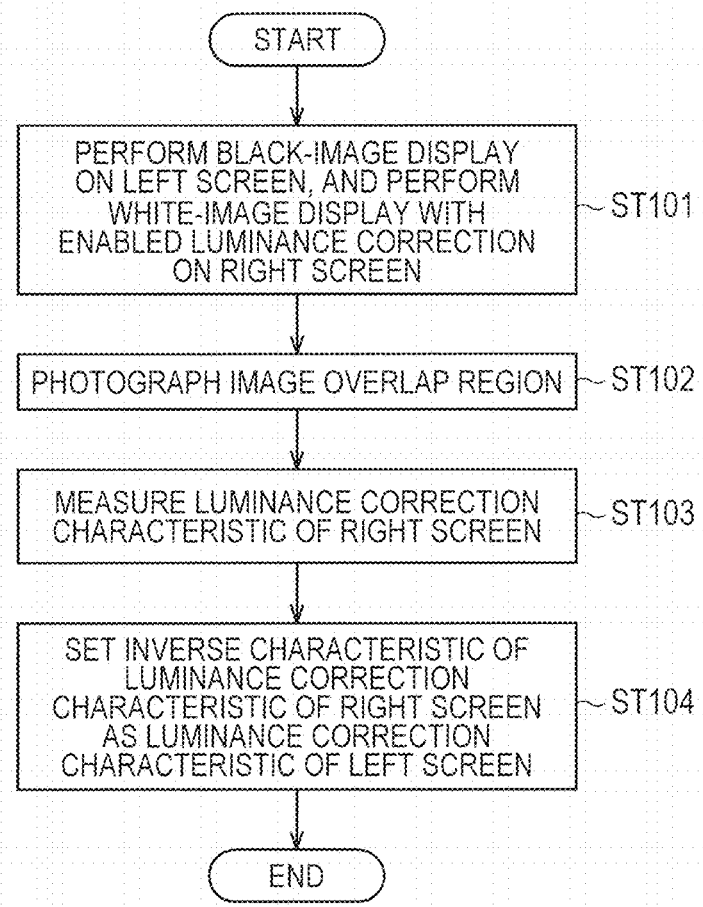

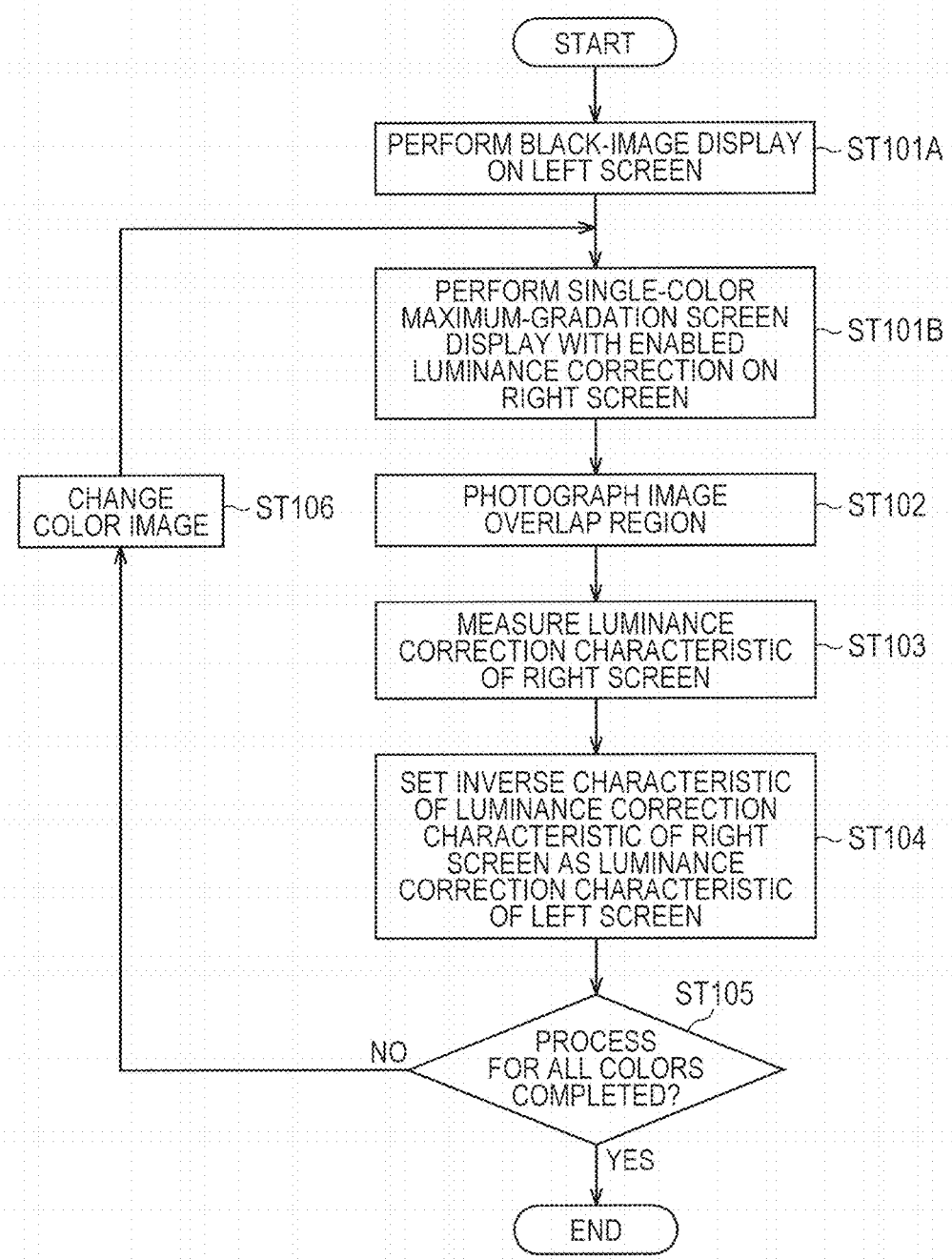

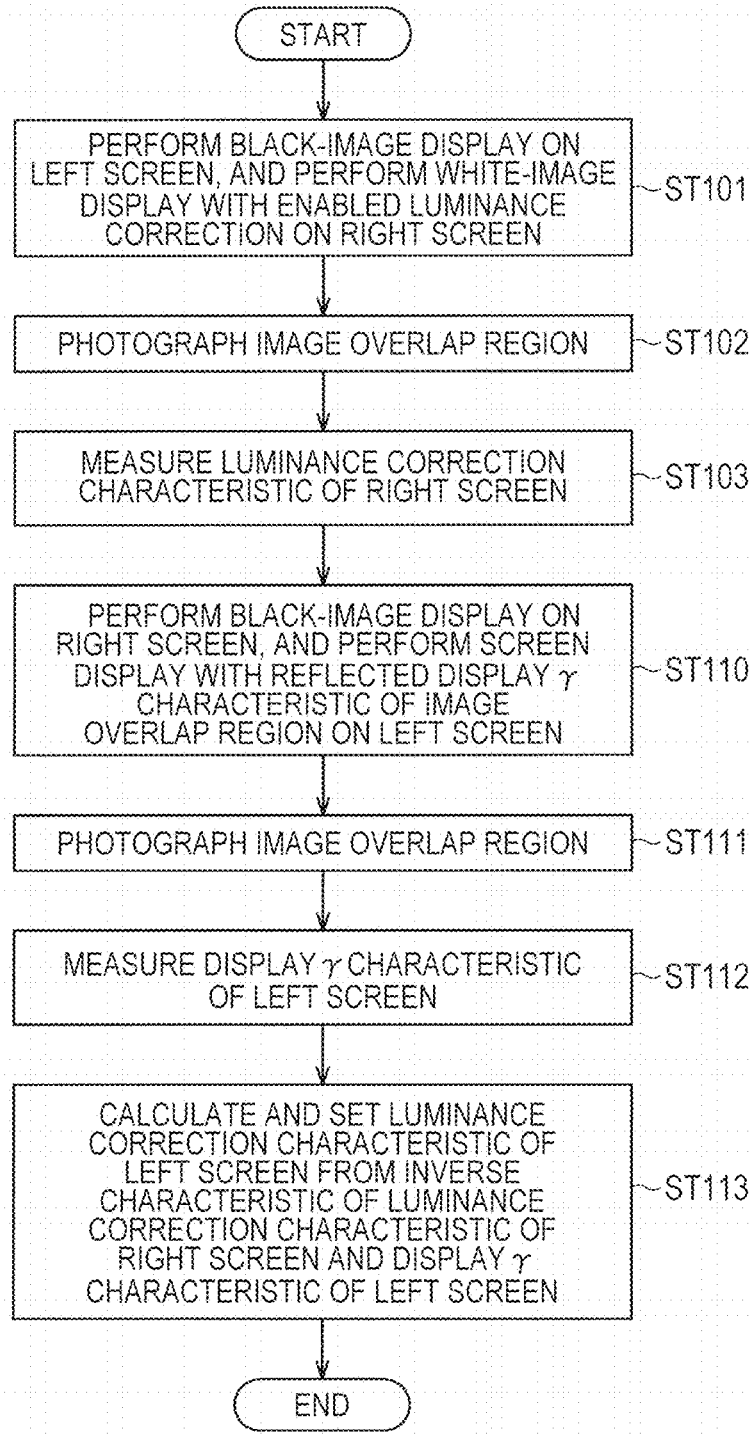

IMAGE DISPLAYING SYSTEM, CONTROLLING METHOD OF IMAGE DISPLAYING SYSTEM, AND STORAGE MEDIUM

BACKGROUND OF THE INVENTION

Field of the Invention

The present invention relates to an image displaying system which projects a projection image from each of a plurality of projection-type image displaying apparatuses to a screen so as to overlap parts of the respective projection images and displays an image constituted by the projection images on the screen, a controlling method of the image displaying system. Moreover, the present invention relates to a program which is used to cause a computer to perform the controlling method of the image displaying system.

Description of the Related Art

Conventionally, in case of constituting a multi-view screen by using a plurality of projection-type image displaying apparatuses, an image overlap region in which respective parts of projection images projected by the adjacent projection-type image displaying apparatuses overlap each other is provided, and luminance correction is performed to image signals in the image overlap region, thereby making the seam at the overlap portion inconspicuous.

Here, there is a method of electrically performing the luminance correction. In such electrical luminance correction, for example, in case of linearly reducing the luminance toward the image edge in the image overlap region, it is necessary, in consideration of a so-called display γ (gamma) characteristic, to have an output image signal Vo as calculated by the following expression (1):

$$Vo = ((x/W)^\gamma) * Vi \qquad (1)$$

In the expression (1), "Vi" indicates an input image signal, "W" indicates the width of the image overlap region, and "x" indicates the distance from the image edge of the image overlap region.

As can be understood from the expression (1), the synthesized luminance in the image overlap region is influenced by the display γ characteristic of each projection-type image displaying apparatus. Such a state will be described hereinafter with reference to FIGS. 11A, 11B and 11C.

FIGS. 11A to 11C are the diagrams for describing the luminance characteristics of the image overlap region. Here, it is assumed in FIGS. 11A to 11C that the display γ characteristic of one of the adjacent projection-type image displaying apparatuses is a display $\gamma_1$ characteristic and the display γ characteristic of the other of the adjacent projection-type image displaying apparatuses is a display $\gamma_2$ characteristic.

As illustrated in FIG. 11A, when the display $\gamma_1$ and $\gamma_2$ characteristics coincide with the display γ characteristic of the expression (1), the luminance correction characteristic of the image overlap region on the left screen and the luminance correction characteristic of the image overlap region on the right screen are cancelled each other, so that the synthesized luminance of the image overlap region becomes uniform. However, if one of the display γ characteristics is small as in the case of $\gamma_1 < \gamma$, the synthesized luminance in the vicinity of the center of the image overlap region raises as illustrated in FIG. 11B. On the other hand, if one of the display γ characteristics is large as in the case of $\gamma_1 > \gamma$, the synthesized luminance in the vicinity of the center of the image overlap region lowers as illustrated in FIG. 11C.

Under the circumstances, for example, Japanese Patent Application Laid-Open No. 2002-238064 discloses the technique by which the image with the predetermined gradation is entirely displayed and photographed by the camera for each projection-type image displaying apparatus, and the synthesized luminance is made uniform by setting the correct display γ characteristic from the photographed image.

The technique disclosed in Japanese Patent Application Laid-Open No. 2002-238064 is to adjust the display γ characteristic for each projection-type image displaying apparatus by the measurement. However, in a case where the luminance correction characteristic of the image overlap region on the own screen to which one projection image is projected and the luminance correction characteristic of the image overlap region on the other screen to which the other projection image is projected are not in the relation of cancellation, the synthesized luminance of the image overlap region is not uniform yet.

The present invention has been completed in consideration of such a problem as described above, and aims to provide a mechanism which enables to uniform the synthesized luminance in the image overlap region of the projection image by a simple process.

SUMMARY OF THE INVENTION

According to the present invention, there is provided an image displaying system in which a plurality of projection-type image displaying apparatuses project projection images to a screen such that parts of the respective projection images overlap, the system, comprising: a display controlling unit configured to perform control to project a black image as a projection image to be projected from a first projection-type image displaying apparatus in the plurality of projection-type image displaying apparatuses to the screen, and project, as a projection image to be projected from a second projection-type image displaying apparatus in the plurality of projection-type image displaying apparatuses to the screen, an image in which dimming correction to an overlap region of the projection images respectively projected by the first and second projection-type image displaying apparatuses has been enabled; a photography controlling unit configured to perform photography control to photograph the overlap region; a measuring unit configured to measure a luminance characteristic of the second projection-type image displaying apparatus, based on a photographed image obtained by the photography controlling unit; and a setting unit configured to set a dimming correction characteristic for the overlap region by the first projection-type image displaying apparatus, based on the luminance characteristic of the second projection-type image displaying apparatus measured by the measuring unit.

Further features of the present invention will become apparent from the following description of exemplary embodiments with reference to the attached drawings.

BRIEF DESCRIPTION OF THE DRAWINGS

FIG. 3 is a flow chart for describing an example of the processing procedure in the controlling method of the image displaying system according to the first embodiment.

FIG. 5 is a flow chart for describing an example of the processing procedure in the controlling method of an image displaying system according to the second embodiment of the present invention.

FIG. 7 is a flow chart for describing an example of the processing procedure in the controlling method of an image displaying system according to the third embodiment.

DESCRIPTION OF THE EMBODIMENTS

Hereinafter, preferred embodiments of the present invention will now be described in detail in accordance with the accompanying drawings. Incidentally, it is assumed that a projection-type image displaying apparatus to be described hereinafter means a projector.

First Embodiment

Initially, the first embodiment of the present invention will be described hereinafter.

Figure 1:
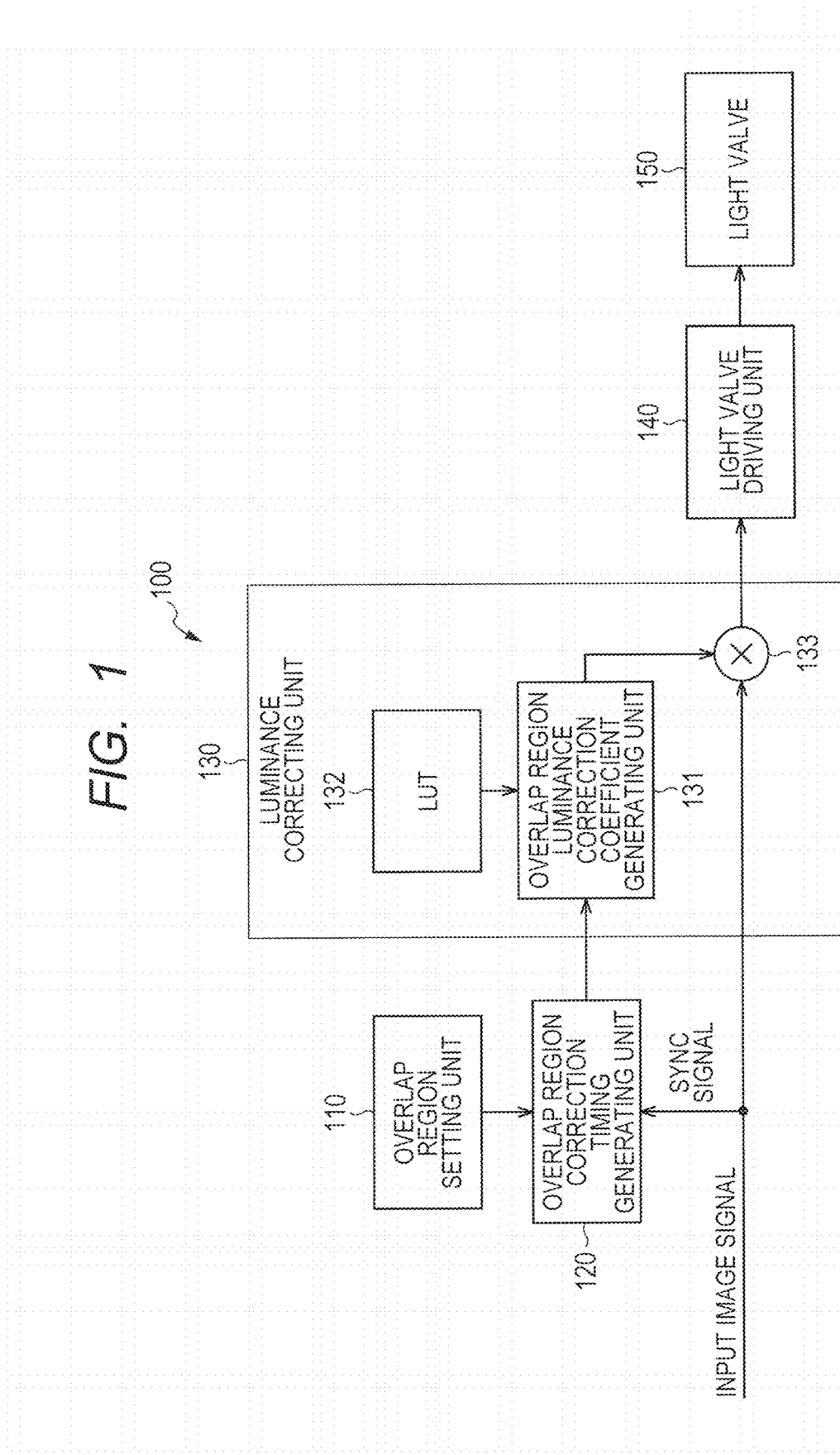
FIG. 1 is a block diagram illustrating an example of the internal constitution of a projection-type image displaying apparatus according to the first embodiment of the present invention.

FIG. 1 is a block diagram illustrating an example of the internal constitution of a projection-type image displaying apparatus 100 according to the first embodiment of the present invention.

As illustrated in FIG. 1, the projection-type image displaying apparatus 100 is constituted by having an overlap region setting unit 110, an overlap region correction timing generating unit 120, a luminance correcting unit 130, a light valve driving unit 140 and a light valve 150.

The overlap region setting unit 110 sets an image overlap region of projected images in the constitution of a multi-view screen.

The overlap region correction timing generating unit 120 generates a pixel position in the image overlap region, which was set at the overlap region setting unit 110, on the basis of a sync signal.

As illustrated in FIG. 1, the luminance correcting unit 130 is constituted by having an overlap region luminance correction coefficient generating unit 131, a luminance correction coefficient storing unit (described as "LUT" in FIG. 1) 132 and a multiplier 133. The overlap region luminance correction coefficient generating unit 131 generates luminance correction data (luminance correction coefficient) to be applied to an input image signal on the basis of a value of the luminance correction coefficient to be read out from the LUT 132 in accordance with the pixel position in an image overlap region to be generated at the overlap region correction timing generating unit 120. The multiplier 133 performs the luminance correction of the input image signal by multiplying the luminance correction data (luminance correction coefficient) to be generated at the overlap region luminance correction coefficient generating unit 131 to the input image signal. An image signal, to which the luminance correction has been performed at the luminance correcting unit 130, is projected to a screen (a screen 210 illustrated in FIG. 2) through the light valve driving unit 140 and the light valve 150.

Figure 2:
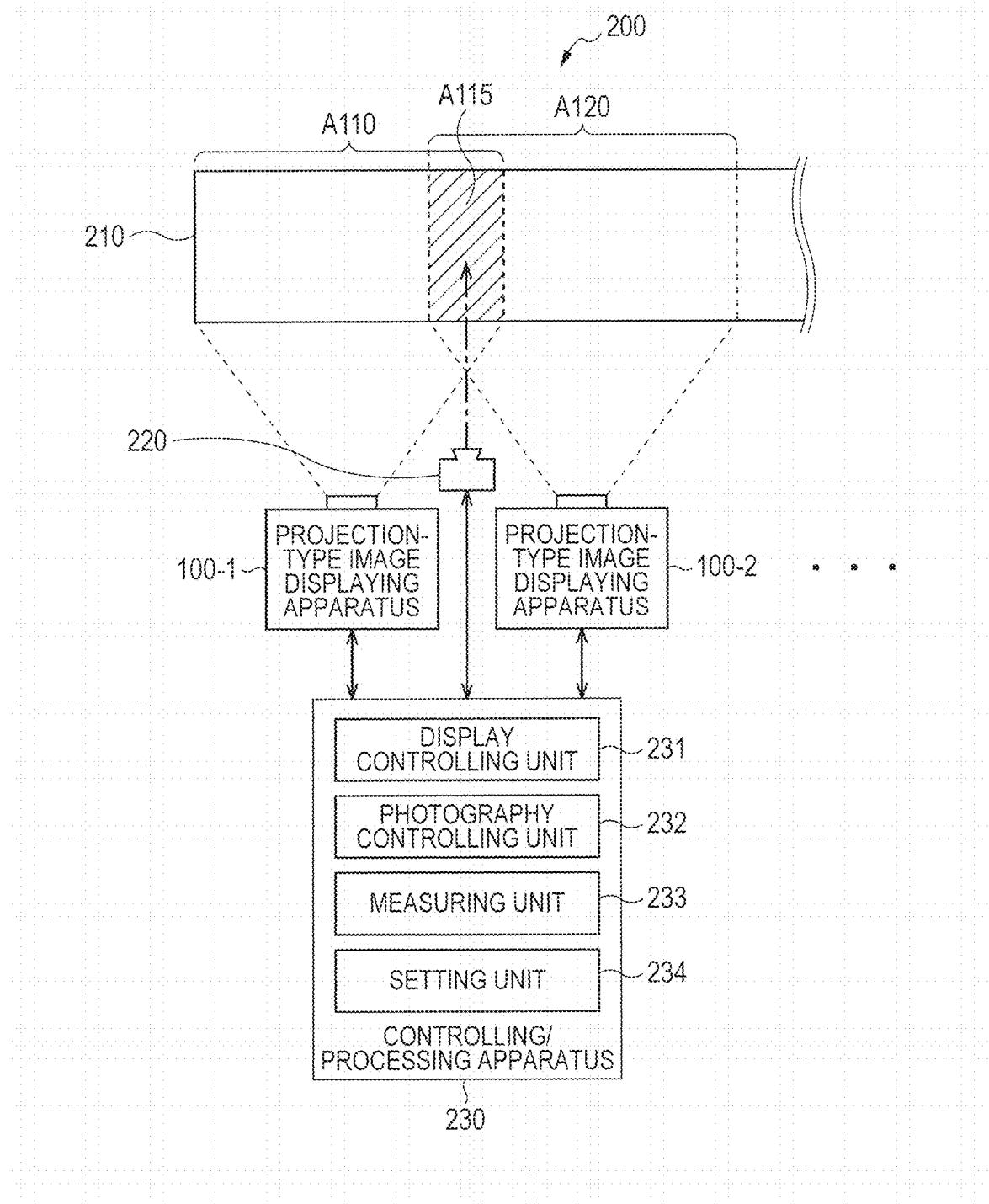
FIG. 2 is a diagram illustrating an example of the schematic configuration of an image displaying system according to the first embodiment.

FIG. 2 is a diagram illustrating an example of the schematic configuration of an image displaying system 200 according to the first embodiment of the present invention.

In the image displaying system 200, each of images is projected to the screen 210 from the each projection-type image displaying apparatus in the plural projection-type image displaying apparatuses 100 in such a manner that a part of each of the projected images is overlapped with each other and then a display image consisted of the projected images is displayed on the screen 210. This image displaying system 200 is configured by having the plural projection-type image displaying apparatuses 100, the screen 210, a photographing apparatus 220 and a controlling/processing apparatus 230.

In FIG. 2, in order to simplify the description, an example, where two projection-type image displaying apparatuses composed of a left side projection-type image displaying apparatus 100-1, which is arranged at the left side, and a right side projection-type image displaying apparatus 100-2, which is arranged at the right side, are illustrated as the plural projection-type image displaying apparatuses 100.

The left side projection-type image displaying apparatus 100-1 and the right side projection-type image displaying apparatus 100-2 are respectively constituted by having the internal constitution illustrated in FIG. 1. The projection-type image displaying apparatuses 100-1 and 100-2 project images to the screen 210 in such a manner that a part of each of the projected images is overlapped with each other on the basis of a control performed by the controlling/processing apparatus 230 and then display a display image consisted of the projected images on the screen 210.

The screen 210 is used to display the projected images projected from the projection-type image displaying apparatuses 100-1 and 100-2. Here, in an example illustrated in FIG. 2, a left screen A110 used for displaying the projected image projected from the left side projection-type image displaying apparatus 100-1 and a right screen A120 used for displaying the projected image projected from the right side projection-type image displaying apparatus 100-2 are formed in the screen 210. In addition, in the example illustrated in FIG. 2, an image overlap region A115, which is an overlap region of these displayed projected images (an overlap region of the left screen A110 and the right screen A120), is formed in the screen 210.

The photographing apparatus 220 generates a photographed image by photographing the image overlap region A115 formed on the screen 210 on the basis of the control performed by the controlling/processing apparatus 230. It is assumed that this photographing apparatus 220 can capture projected images projected on the screen 210 without lacking the projected images.

The controlling/processing apparatus 230 totally controls operations in the image displaying system 200 and performs various processes in accordance with necessity. As illustrated in FIG. 2, this controlling/processing apparatus 230 is constituted by having a display controlling unit 231, a photography controlling unit 232, a measuring unit 233 and a setting unit 234.

The display controlling unit 231 controls to project images from the projection-type image displaying apparatuses 100-1 and 100-2 to the screen 210 in such a manner that a part of each of the projected images is overlapped with each other and performs a display control of displaying the display image consisted of the projected images on the screen 210.

Here, in the first embodiment, the projection-type image displaying apparatus (first projection-type image displaying apparatus) for which the luminance correction is performed (hereinafter, called a luminance-correction projection-type image displaying apparatus) is treated as the left side projection-type image displaying apparatus 100-1, and the projection-type image displaying apparatus (second projection-type image displaying apparatus) for which the luminance correction is not performed (hereinafter, called a luminance-noncorrection projection-type image displaying apparatus) is treated as the right side projection-type image displaying apparatus 100-2. In this case, in the first embodiment, the display controlling unit 231 performs a display control in which a display to the left screen A110 of the projected image in the left side luminance-correction projection-type image displaying apparatus 100-1 is set as a black-image display. At the same time, the display controlling unit 231 performs a display control in which a display to the right screen A120 of the projected image in the right side luminance-noncorrection projection-type image displaying apparatus 100-2 is set as a screen display in which the luminance correction is enabled (specifically, a white-image display in the first embodiment).

The photography controlling unit 232 performs a photography control which makes the photographing apparatus 220 perform to photograph the image overlap region A115 by controlling the photographing apparatus 220.

The measuring unit 233 measures a luminance correction characteristic of the image overlap region A115 on the basis of a photographed image obtained in the photographing apparatus 220 by the photography control performed by the photography controlling unit 232. Specifically, in the first embodiment, the measuring unit 233 measures the luminance correction characteristic (second luminance correction characteristic) of the image overlap region A115 of the projected image in the right side projection-type image displaying apparatus 100-2 which is the luminance-noncorrection projection-type image displaying apparatus (second projection-type image displaying apparatus).

The setting unit 234 sets a luminance correction of the image overlap region A115 of the projected image in the luminance-correction projection-type image displaying apparatus (first projection-type image displaying apparatus) on the basis of an inverse characteristic in the luminance correction characteristic measured in the measuring unit 233. Specifically, in the first embodiment, the setting unit 234 sets the luminance correction characteristic (first luminance correction characteristic) of the image overlap region A115 of the projected image in the left side luminance-correction projection-type image displaying apparatus 100-1 into the LUT 132 of this left side projection-type image displaying apparatus 100-1.

Next, a processing procedure in a controlling method of the image displaying system 200 according to the first embodiment will be described.

FIG. 3 is a flow chart for describing an example of the processing procedure in the controlling method of the image displaying system 200 according to the first embodiment of the present invention.

Figure 4A:
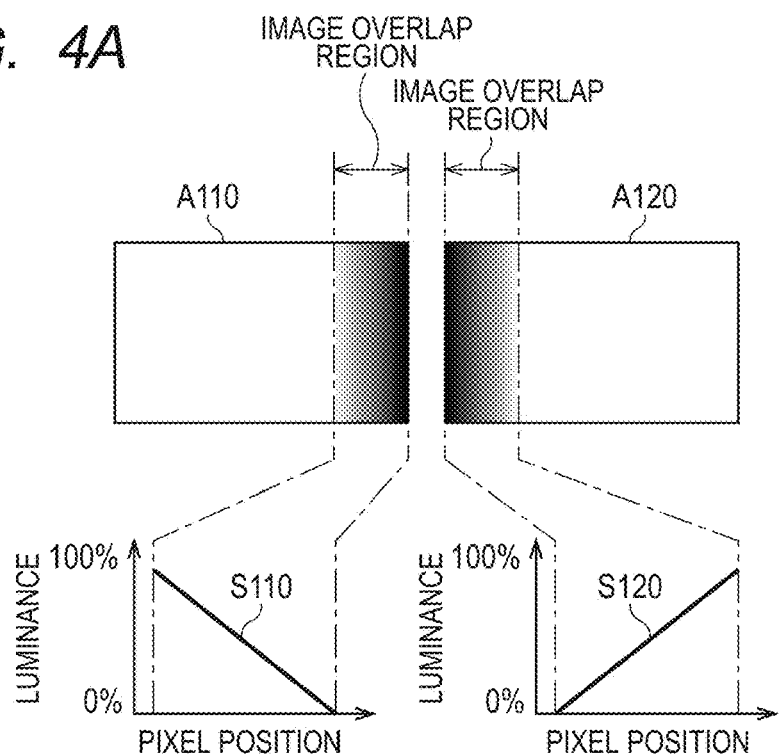
FIGS. 4A and 4B are diagrams for describing the displaying states of projected images and the luminance correction characteristics in the first embodiment.
Figure 4B:
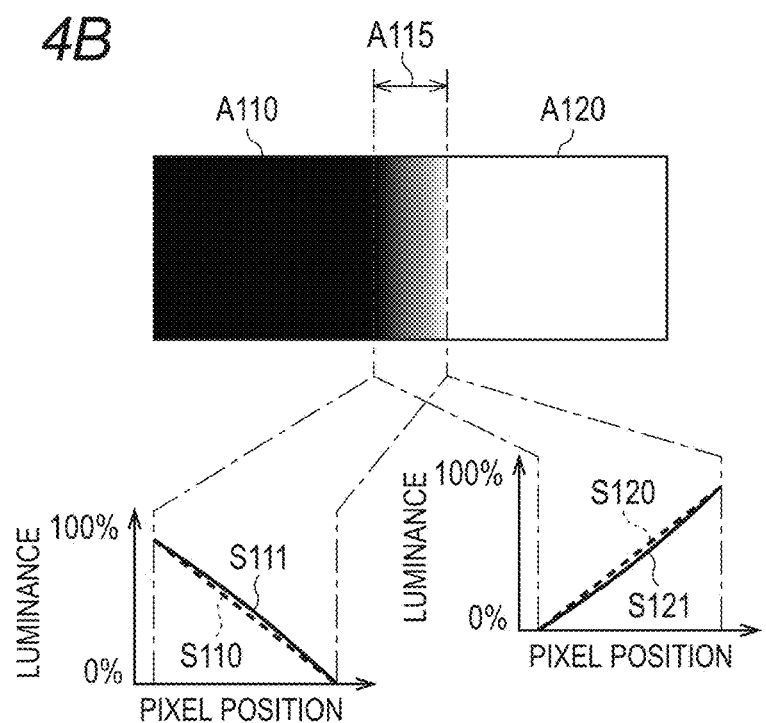

FIGS. 4A and 4B, which illustrate the first embodiment of the present invention, are diagrams for describing the displaying states of projected images and the luminance correction characteristics. In a multi-screen having two screens illustrated in FIG. 2, the luminance correction is performed at the right side in the left screen A110 and the luminance correction is performed at the left side in the right screen A120 as illustrated in FIG. 4A. Here, as for the luminance correction characteristic, such the characteristic of linearly decreasing the luminance from an internal portion toward an edge portion of the screens (displayed projected images) as illustrated in a luminance correction characteristic S110 of FIG. 4A in the left screen A110 and as illustrated in a luminance correction characteristic S120 of FIG. 4A in the right screen A120 is provided.

Hereinafter, a flow chart of FIG. 3 will be described. First, in a step ST101, the display controlling unit 231 performs a display control in which a display to the left screen A110 of the projected image in the left side projection-type image displaying apparatus 100-1, which is the luminance-correction projection-type image displaying apparatus (first projection-type image displaying apparatus), is set as the black-image display. At the same time, the display controlling unit 231 performs a display control in which a display to the right screen A120 of the projected image in the right side projection-type image displaying apparatus 100-2, which is the luminance-noncorrection projection-type image displaying apparatus (second projection-type image displaying apparatus), is set as the white-image display in which the luminance correction is enabled.

Specifically, in the step ST101 of FIG. 3, the left screen A110 is set as the black-image display (or the screen which is not displayed) and the right screen A120 is set as the white-image display, in which the luminance correction is enabled, as illustrated in FIG. 4B. Note that the black image indicates such an image of having a minimum luminance value and the white image indicates such an image of having a maximum luminance value. The black image also includes a case of not projecting an image.

Subsequently, in a step ST102, the photography controlling unit 232 performs a photography control which makes the photographing apparatus 220 perform to photograph the image overlap region A115 by controlling the photographing apparatus 220. Specifically, in the step ST102, a control of photographing the image overlap region A115 indicated in FIG. 4B is performed.

Subsequently, in a step ST103, the measuring unit 233 measures a luminance correction characteristic of the image overlap region A115 of the right screen A120 on the basis of the photographed image obtained in the photographing apparatus 220 by the photography control of the step ST102. That is, the measuring unit 233 measures a luminance correction characteristic (second luminance correction characteristic) of the image overlap region A115 of the projected image in the right side luminance-noncorrection projection-type image displaying apparatus 100-2. Specifically, in the step ST103, a luminance correction characteristic S121 indicated in FIG. 4B is measured.

Subsequently, in a step ST104, the setting unit 234 sets the luminance correction characteristic (first luminance correction characteristic) of the image overlap region A115 of the projected image (that is, the left screen A110) in the left side luminance-correction projection-type image displaying apparatus 100-1 into this left side projection-type image displaying apparatus 100-1 on the basis of the inverse characteristic in the luminance correction characteristic measured in the step ST103. Specifically, in the step ST104, a luminance correction characteristic S111, which is an inverse characteristic of the luminance correction characteristic S121 indicated in FIG. 4B, is stored into the LUT 132 of the left side projection-type image displaying apparatus 100-1 and set as the luminance correction data (luminance correction coefficient).

When the process in the step ST104 is completed, the processes of a flow chart in FIG. 3 are terminated.

Thereafter, the luminance correction of an input image signal is performed in the left side luminance-correction projection-type image displaying apparatus 100-1 on the basis of the luminance correction data (luminance correction coefficient) which was set in the LUT 132.

In the first embodiment, the luminance-correction projection-type image displaying apparatus (the first projection-type image displaying apparatus) was treated as the left side projection-type image displaying apparatus 100-1, and the luminance-noncorrection projection-type image displaying apparatus (the second projection-type image displaying apparatus) was treated as the right side projection-type image displaying apparatus 100-2. However, present invention is not limited to such a configuration, and, for example, a reversed configuration may be applied. That is, a configuration, in which the luminance-correction projection-type image displaying apparatus (the first projection-type image displaying apparatus) is treated as the right side projection-type image displaying apparatus 100-2 and the luminance-noncorrection projection-type image displaying apparatus (the second projection-type image displaying apparatus) is treated as the left side projection-type image displaying apparatus 100-1, is also applicable to the present invention. In this case, the configuration, in which the luminance correction characteristic of the image overlap region A115 of the left screen A110 is measured and the inverse characteristic of this measured luminance correction characteristic is set in the right side projection-type image displaying apparatus 100-2 as the luminance correction characteristic of the image overlap region A115 of the right screen A120, is adopted.

In the first embodiment, although the luminance correction characteristic has been described as such the characteristic of linearly decreasing the luminance from an internal portion toward an edge portion of the screens (displayed projected images) as illustrated in FIGS. 4A and 4B, it is not limited to this configuration in the present invention. In the present invention, the luminance correction characteristic may be such a characteristic featured by that the synthesized luminance of the image overlap region A115 becomes the unified luminance.

As described above, in the first embodiment, the luminance correction characteristic of the image overlap region A115 of the projected image in the luminance-noncorrection projection-type image displaying apparatus (the second projection-type image displaying apparatus) is measured. Then, the inverse characteristic in the measured luminance correction characteristic is set in the luminance-correction projection-type image displaying apparatus as the luminance correction characteristic of the image overlap region A115 of the projected image in the luminance-correction projection-type image displaying apparatus (the first projection-type image displaying apparatus). According to this configuration, the luminance correction characteristic in the image overlap region A115 of the own screen (for example, the left screen A110) can be treated as the characteristic of offsetting the luminance correction characteristic in the image overlap region A115 of the other screen (for example, the right screen A120) to be overlapped with the own screen. Accordingly, the synthesized luminance in the image overlap region A115 of the projected image can be unified by a simple process.

Second Embodiment

Next, the second embodiment of the present invention will be described hereinafter.

In the above described first embodiment, a display to the right screen A120 of the projected image in the right side luminance-noncorrection projection-type image displaying apparatus 100-2 was set as the white-image display in which the luminance correction was enabled. In this case, the same luminance correction data (luminance correction coefficient) is to be used for all the color images (generally, three colors of R, G and B, however, it is not limited to a case of these colors) which compose the projected image. From this point of view, in the second embodiment, the better luminance correction can be attained by performing optimization after setting the luminance correction data (luminance correction coefficient) for each of the color images which compose the projected image.

The schematic configuration of an image displaying system according to the second embodiment is similar to that of the image displaying system 200 according to the first embodiment indicated in FIG. 2. In the image displaying apparatus 200 according to the second embodiment, the left side projection-type image displaying apparatus 100-1 and the right side projection-type image displaying apparatus 100-2 are respectively constituted by having the internal constitution illustrated in FIG. 1.

Next, a processing procedure in a controlling method of the image displaying system 200 according to the second embodiment will be described.

FIG. 5 is a flow chart for describing an example of the processing procedure in the controlling method of the image displaying system 200 according to the second embodiment of the present invention. In FIG. 5, the same reference numeral is given to a processing step which is the same as that indicated in FIG. 3.

First, in a step ST101A, the display controlling unit 231 performs a display control, in which a display to the left screen A110 of the projected image in the left side projection-type image displaying apparatus 100-1, which is the luminance-correction projection-type image displaying apparatus (the first projection-type image displaying apparatus) is set as a black-image display.

Subsequently, in a step ST101B, the display controlling unit 231 performs a display control, in which a display to the right screen A120 of the projected image in the right side projection-type image displaying apparatus 100-2, which is the luminance-noncorrection projection-type image displaying apparatus (the second projection-type image displaying apparatus), is set as a maximum gradation screen display of single color of a certain color image composing the projected image, in which the luminance correction is enabled. For example, when the projection-type image displaying apparatus 100 performs an image display by using three colors consisted of R, G and B, for example, a display control adopting the maximum gradation screen display of R (Red) is performed here.

Subsequently, in the step ST102, the photography controlling unit 232 performs a photography control which makes the photographing apparatus 220 perform to photograph the image overlap region A115 by controlling the photographing apparatus 220.

Subsequently, in the step ST103, the measuring unit 233 measures the luminance correction characteristic of the image overlap region A115 of the right screen A120 on the basis of the photographed image obtained in the photographing apparatus 220 by the photography control of the step ST102. That is, the measuring unit 233 measures the luminance correction characteristic (the second luminance correction characteristic) of the image overlap region A115 of the projected image in the right side luminance-noncorrection projection-type image displaying apparatus 100-2.

Subsequently, in the step ST104, the setting unit 234 sets the luminance correction characteristic (the first luminance correction characteristic) of the image overlap region A115 of the projected image (that is, the left screen A110) in the left side luminance-correction projection-type image displaying apparatus 100-1 in this left side projection-type image displaying apparatus 100-1 on the basis of the inverse characteristic in the luminance correction characteristic measured in the step ST103. A specific process example of this step ST104 is similar to that described in the step ST104 in FIG. 3.

Subsequently, in a step ST105, the controlling/processing apparatus 230 decides whether or not processes we re completed for all the color images which compose the projected image.

As a result of the decision in the step ST105, when the processes are not yet completed for all the color images which compose the projected image, the flow advances to a step S106. When the flow advanced to the step S106, the controlling/processing apparatus 230 performs a process of changing a color image targeted to be processed. For example, in a case that a process was completed for the R image but processes are not yet completed for the G and B images, a change process, by which one of the unprocessed G and B images is regarded as the color image targeted to be processed, is performed. Thereafter, processes after the step ST101B are performed for the changed color image targeted to be processed.

On the other hand, as a result of the decision in the step ST105, when processes were completed for all the color images which compose the projected image, the processes of the flow chart in FIG. 5 are terminated. In the second embodiment, since the process in the step ST104 is performed for each color of the color images which compose the projected image, the setting unit 234 sets the luminance correction data (luminance correction coefficient) in the LUT 132 of the left side projection-type image displaying apparatus 100-1 for each color of the color images which compose the projected image.

Thereafter, in the left side luminance-correction projection-type image displaying apparatus 100-1, the luminance correction of an input image signal is performed on the basis of the luminance correction data (luminance correction coefficient) for each color which was set in the LUT 132.

In FIG. 1, it is described that only the one LUT 132 is provided, however, it is assumed that the LUTs 132 in the second embodiment are provided for each of colors of the color images which compose the projected image.

Also, in the second embodiment, the luminance-correction projection-type image displaying apparatus (the first projection-type image displaying apparatus) is treated as the left side projection-type image displaying apparatus 100-1, and the luminance-noncorrection projection-type image displaying apparatus (the second projection-type image displaying apparatus) is treated as the right side projection-type image displaying apparatus 100-2. However, in the present invention, it is not limited to this configuration, and, for example, a reversed configuration may be also applied. That is, such a configuration, in which the luminance-correction projection-type image displaying apparatus (the first projection-type image displaying apparatus) is treated as the right side projection-type image displaying apparatus 100-2 and the luminance-noncorrection projection-type image displaying apparatus (the second projection-type image displaying apparatus) is treated as the left side projection-type image displaying apparatus 100-1, is also applicable to the present invention. In this case, the configuration, in which the luminance correction characteristic of the image overlap region A115 of the left screen A110 is measured and an inverse characteristic of this measured luminance correction characteristic is set in the right side projection-type image displaying apparatus 100-2 as the luminance correction characteristic of the image overlap region A115 of the right screen A120, is adopted.

As described above, in the second embodiment, the luminance correction characteristic of the image overlap region A115 of the projected image in the luminance-noncorrection projection-type image displaying apparatus (second projection-type image displaying apparatus) is measured for each of colors of the color images which compose the projected image. Then, the inverse characteristic in the measured luminance correction characteristic is set in the luminance-correction projection-type image displaying apparatus as the luminance correction characteristic of the image overlap region A115 of the projected image in the luminance-correction projection-type image displaying apparatus (the first projection-type image displaying apparatus).

According to this configuration, the synthesized luminance in the image overlap region A115 of the projected image can be unified by a simple process similar to an effect in the first embodiment. Further, according to the second embodiment, the better luminance correction can be attained by performing optimization after setting the luminance correction characteristic for each of colors of the color images which compose the projected image.

Third Embodiment

Next, the third embodiment of the present invention will be described hereinafter.

Generally, an image displaying apparatus has an image signal (image signal gradation)-output luminance (display luminance) characteristic featured by that a display gamma ($\gamma$) characteristic is in such a state of $\gamma=2.2$. As for the luminance correction characteristics in the above-described first and second embodiments, a signal processing system, in which the luminance characteristic is linearly expressed (the image signal-output luminance characteristic is linearly expressed), is assumed. However, when it is such a signal processing system in which the luminance characteristic is not linearly expressed, the display $\gamma$ characteristic should be considered as the luminance correction data (luminance correction coefficient). Therefore, the third embodiment adopts a configuration that the luminance correction data (luminance correction coefficient) is set under the consideration of the display $\gamma$ characteristic by assuming a case of the signal processing system in which the luminance characteristic is not linearly expressed.

The schematic configuration of an image displaying system according to the third embodiment is similar to that of the image displaying system 200 according to the first embodiment indicated in FIG. 2. In the image displaying system 200 according to the third embodiment, the left side projection-type image displaying apparatus 100-1 and the right side projection-type image displaying apparatus 100-2 are respectively constituted by having the internal constitution illustrated in FIG. 1.

Figure 6:
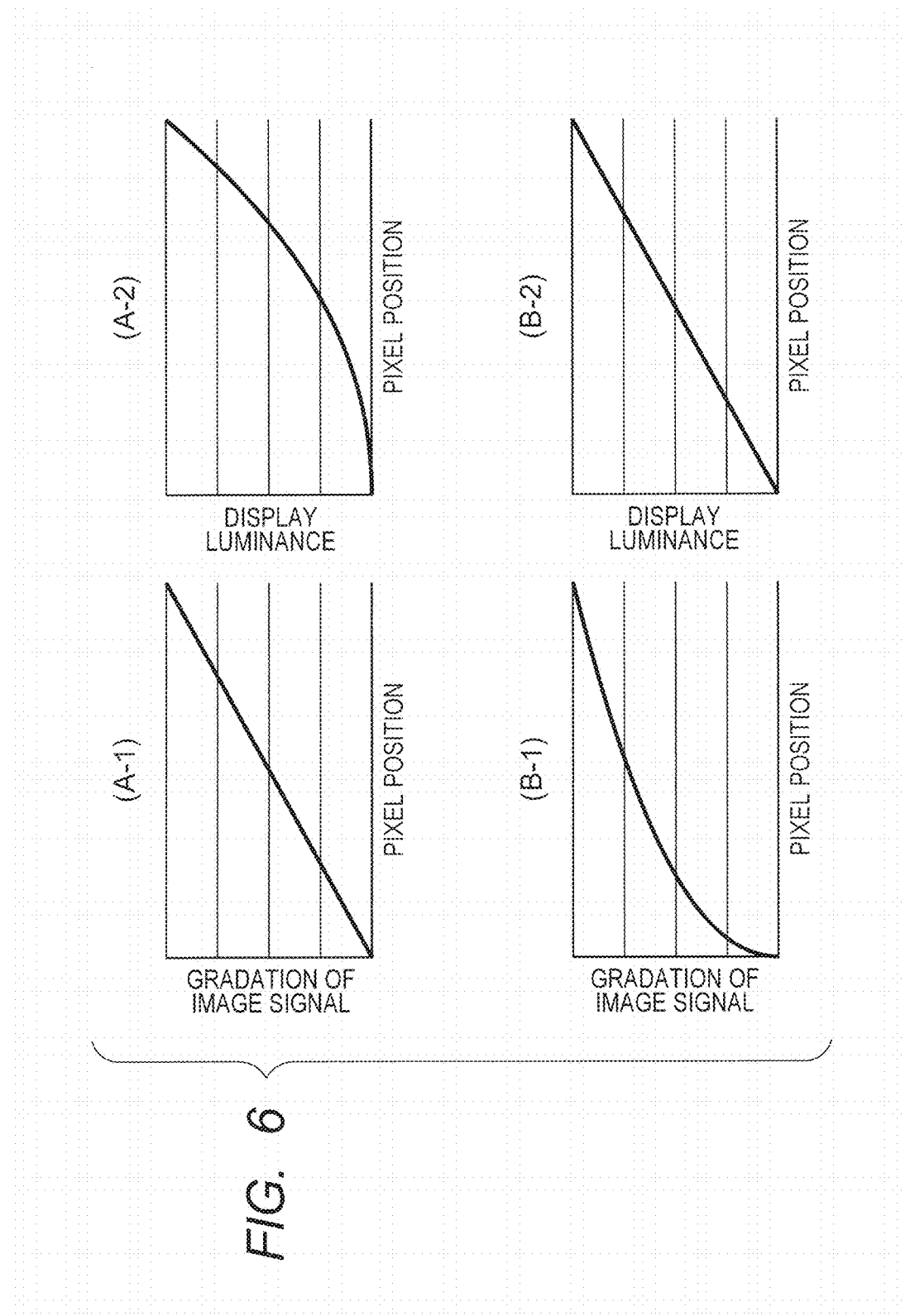
FIG. 6 is a diagram illustrating examples of the relation between image signals (gradations of the image signals) and output luminances (display luminances) in the third embodiment of the present invention.

FIG. 6, which indicates the third embodiment of the present invention, is a diagram illustrating an example of the relation between the image signal (image signal gradation) and the output luminance (display luminance).

Specifically, when a gradation characteristic of an image signal in the image overlap region A115 in the signal processing system, in which the luminance characteristic is not linearly expressed, is set to be linearly expressed as indicated in (A-1) of FIG. 6, a display luminance characteristic coincides with the display γ characteristic as indicated in (A-2) of FIG. 6. Therefore, the display luminance characteristic can be treated as a linear characteristic as indicated in (B-2) of FIG. 6 by raising a gradation characteristic (here, linearity) of a desired image signal to the 1/(display γ characteristic) power as indicated in (B-1) of FIG. 6.

In the third embodiment, the setting has to be performed by calculating the luminance correction data (luminance correction coefficient) by matching with the display γ characteristic of the own screen (for example, the left screen A110).

Next, a processing procedure in a controlling method of the image displaying system 200 according to the third embodiment, where the luminance correction data (luminance correction coefficient) is optimized by considering the display γ characteristic of the own screen (specifically, the left screen A110), will be described.

FIG. 7 is a flow chart for describing an example of the processing procedure in the controlling method of the image displaying system 200 according to the third embodiment of the present invention. In FIG. 7, the same reference numeral is given to a process step which is the same as that indicated in FIG. 3.

First, in the step ST101, the display controlling unit 231 performs a display control in which a display to the left screen A110 of the projected image in the left side projection-type image displaying apparatus 100-1, which is the luminance-correction, projection-type image displaying apparatus (the first projection-type image displaying apparatus), is set as a black-image display. At the same time, the display controlling apparatus 231 performs a display control in which a display to the right screen A120 of the projected image in the right side projection-type image displaying apparatus 100-2, which is the luminance-noncorrection projection-type image displaying apparatus (the second projection-type image displaying apparatus), is set as a white-image display in which the luminance correction is enabled. This step ST101 corresponds to a first display controlling step.

Figure 8A:
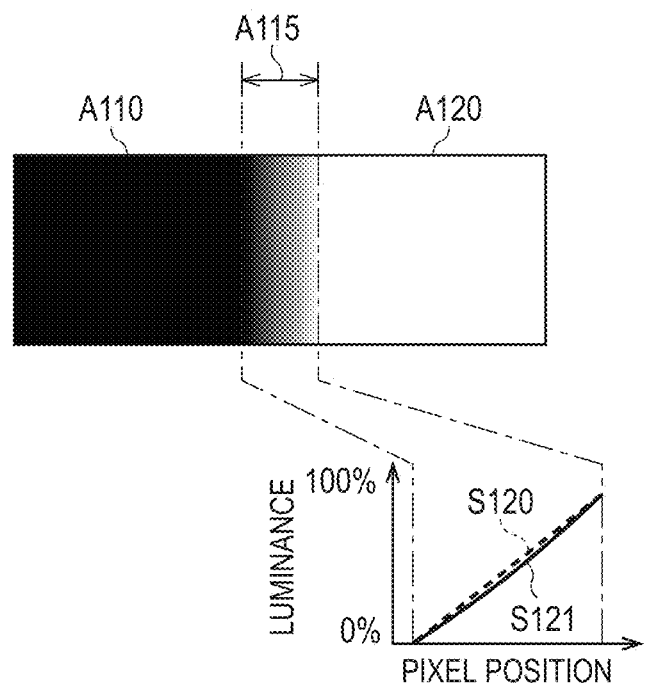
FIGS. 8A and 8B are diagrams for describing the displaying states of projected images and the luminance correction characteristics in the third embodiment.
Figure 8B:
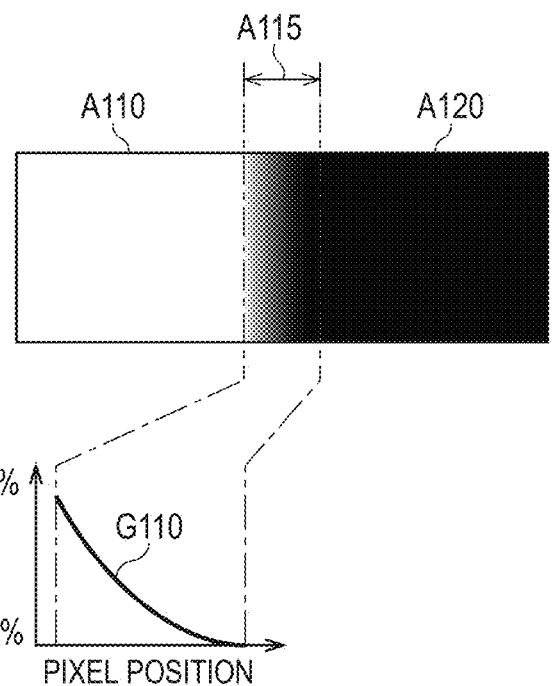

FIGS. 8A and 8B, which indicate the third embodiment of the present invention, are diagrams for describing the displaying states of projected images and the luminance correction characteristics. Specifically, in the step ST101 of FIG. 7, the left screen A110 is set as the black-image display (or the screen which is not displayed) and the right screen A120 is set as the white-image display in which the luminance correction is enabled, as illustrated in FIG. 8A.

Subsequently, in a step ST102, the photography controlling unit 232 performs a photography control which makes the photographing apparatus 220 perform to photograph the image overlap region A115 by controlling the photographing apparatus 220. This step ST102 corresponds to a first photography controlling step. Specifically, in this step ST102, a control of photographing the image overlap region A115 illustrated in FIG. 8A is performed.

Subsequently, in the step ST103, the measuring unit 233 measures the luminance correction characteristic of the image overlap region A115 of the right image A120 on the basis of the photographed image obtained in the photographing apparatus 220 by the photography control of the step ST102. That is, the measuring unit 233 measures the luminance correction characteristic (the second luminance correction characteristic) of the image overlap region A115 of the projected image in the right side luminance-noncorrection projection-type image displaying apparatus 100-2. This step ST103 corresponds to a first measuring step. Specifically, in this step ST103, a luminance correction characteristic S121 indicated in FIG. 8A is measured. In this case, the luminance correction characteristic S121 is expressed by a numerical expression as $f(x)$.

Subsequently, in a step ST110, the display controlling unit 231 performs a display control in which a display to the right screen A120 of the projected image in the right side projection-type image displaying apparatus 100-2, which is the luminance-noncorrection projection-type image displaying apparatus (the second projection-type image displaying apparatus), is set as the black-image display. At the same time, the display controlling apparatus 231 performs a display control in which a display to the left screen A110 of the image overlap region A115 of the projected image in the left side projection-type image displaying apparatus 100-1, which is the luminance-correction projection-type image displaying apparatus (the first projection-type image displaying apparatus), is set as a screen display which reflects the display γ characteristic. This step ST110 corresponds to a second display controlling step. Specifically, in this step ST110, as illustrated in FIG. 8A, the right screen A120 is set as the black image display (or the screen which is not displayed) and the image overlap region A115 of the left screen A110 is set as the screen display which reflects the display gamma γ characteristic.

Here, as for the screen display which reflects the display gamma γ characteristic, in case of the signal processing system in which the luminance characteristic is not linearly expressed, the image signal gradation linearly changes from 0% to 100%. That is, in this step ST110, a display of the image overlap region A115 of the left screen A110 is set as a screen display, in which the image signal gradation linearly changes, such that the display luminance at an inside part of the projected image in the image overlap region A115 of the projected image projected to the left screen A110 becomes 100% and the display luminance at an edge part of the projected image in the image overlap region A115 of the projected image becomes 0% as illustrated in FIG. 8B.

Subsequently, in a step ST111, the photography controlling unit 232 performs the photography control which makes the photographing apparatus 220 perform to photograph the image overlap region A115 by controlling the photographing apparatus 220. This step ST111 corresponds to a second photography controlling step. Specifically, in this step ST111, a control of photographing the image overlap region A115 illustrated in FIG. 8B is performed.

Subsequently, in a step ST112, the measuring unit 233 measures the display γ characteristic of the image overlap region A115 of the left screen A110 on the basis of the photographed image obtained in the photographing apparatus 220 by the photography control of the step ST111. That is, the measuring unit 233 measures the luminance characteristic of the image overlap region A115 of the projected image in the left side projection-type image displaying apparatus 100-1 which is the luminance-correction projection-type image displaying apparatus (the first projection-type image displaying apparatus). This step ST112 corresponds to a second measuring step. Specifically, in this step ST112, a luminance characteristic G110 illustrated in FIG. 8B is measured. In this case, the luminance characteristic G110, which is the display γ characteristic, is assumed to be expressed as $\gamma_{10}$.

Subsequently, in a step St113, the setting unit 234 calculates the luminance correction characteristic (first luminance correction characteristic) of the image overlap region A115 of the projected image (that is, the left screen A110) in the left side luminance-correction projection-type image displaying apparatus 100-1 in accordance with an inverse characteristic in the luminance correction characteristic (the second luminance correction characteristic) which was measured in the step ST103 and the luminance characteristic (display γ characteristic) which was measured in the step ST112 and then sets the calculated luminance correction characteristic in the left side projection-type image displaying apparatus 100-1. This step St113 corresponds to a setting step. Specifically, in the step ST113, $f(x)^{\wedge}(1/\gamma_{10})$ is calculated as the first luminance correction characteristic and this calculated result is stored into the LUT 132 of the left side projection-type image displaying apparatus 100-1 and set as the luminance correction data (luminance correction coefficient).

When the process of the step S113 is completed, the processes of the flow chart in FIG. 7 are terminated.

Thereafter, in the left side luminance-correction projection-type image displaying apparatus 100-1, the luminance correction of an input image signal is performed on the basis of the luminance correction data (luminance correction coefficient) which was set in the LUT 132.

Here, although a specific method, which was described in the second embodiment, of setting the luminance correction characteristic for each of colors of the color images which compose the projected image will not be described, the method described in the second embodiment is also applicable in the third embodiment. That is, in the third embodiment, the luminance correction characteristic is calculated by repeating the processes in the steps ST101 to ST113 in FIG. 7 for each of colors of the color images which compose the projected image similar to the second embodiment, and the calculated luminance correction characteristic may be stored into the LUT 132 of the left side projection-type image displaying apparatus 100-1 and may be set.

Also in the third embodiment, the luminance-correction projection-type image displaying apparatus (the first projection-type image displaying apparatus) was treated as the left side projection-type image displaying apparatus 100-1, and the luminance-noncorrection projection-type image displaying apparatus (the second projection-type image displaying apparatus) was treated as the right side projection-type image displaying apparatus 100-2. However, in the present invention, it is not limited to this configuration, and, for example, a reversed configuration may be also applied. That is, such a configuration, in which the luminance-correction projection-type image displaying apparatus (the first projection-type image displaying apparatus) is treated as the right side projection-type image displaying apparatus 100-2 and the luminance-noncorrection projection-type image displaying apparatus (the second projection-type image displaying apparatus) is treated as the left side projection-type image displaying apparatus 100-1, is also applicable to the present invention. In the case of this configuration, first, the luminance correction characteristic of the image overlap region A115 of the left screen A110 and the luminance characteristic (display γ characteristic) of the image overlap region A115 of the right screen A120 are measured. Then, such a configuration, in which the luminance correction characteristic of the image overlap region A115 of the right screen A120 is calculated in accordance with the inverse characteristic in the measured luminance correction characteristic of the image overlap region A115 of the left screen A110 and the measured luminance characteristic of the image overlap region A115 of the right screen A120 and then the calculated luminance correction characteristic is set in the right side projection-type image displaying apparatus 100-2, is adopted.

As described above, in the third embodiment, the luminance correction characteristic of the image overlap region A115 of the projected image in the luminance-noncorrect projection-type image displaying apparatus (the second projection-type image displaying apparatus) and the luminance characteristic (display γ characteristic) of the image overlap region A115 of the projected image in the luminance-correction projection-type image displaying apparatus (the first projection-type image displaying apparatus) are measured. Then, the luminance correction characteristic of the image overlap region A115 of the projected image in the luminance-correction projection-type image displaying apparatus (the first projection-type image displaying apparatus) is calculated in accordance with the inverse characteristic in the measured luminance correction characteristic and the measured luminance characteristic (display γ characteristic) and then the calculated luminance correction characteristic is set in the luminance-correction projection-type image displaying apparatus.

According to this configuration, also in the case of the signal processing system in which the luminance characteristic is not linearly expressed, the synthesized luminance in the image overlap region A115 of the projected image can be unified by a simple process similar to an effect in the first embodiment.

Fourth Embodiment

Next, the fourth embodiment of the present invention will be described.

In the above-described first to third embodiments, the multi-view screen was constituted in a screen by arranging the two projection-type image displaying apparatuses 100 on the left and right sides. In the fourth embodiment, a multi-view screen is constituted in a screen by the nine projection-type image displaying apparatuses 100 arranged in a matrix state having three screens in the lateral direction and three screens in the longitudinal direction as the plural projection-type image displaying apparatuses 100.

Although the schematic configuration of an image displaying system according to the fourth embodiment is almost similar to that of the image displaying system 200 according to the first embodiment indicated in FIG. 2, the number and arrangement of the projection-type image displaying apparatuses 100 are different from those in the first embodiment. That is, in the schematic configuration of the image displaying system according to the fourth embodiment, the nine projection-type image displaying apparatuses 100 arranged in a matrix state having three screens in the lateral direction and three screens in the longitudinal direction are disposed instead of the two projection-type image displaying apparatuses 100 disposed by arranging them on the left and right sides indicated in FIG. 2. In the image displaying system according to the fourth embodiment, each of the projection-type image displaying apparatuses 100 is constituted by having the internal constitution illustrated in FIG. 1.

Figure 9A:
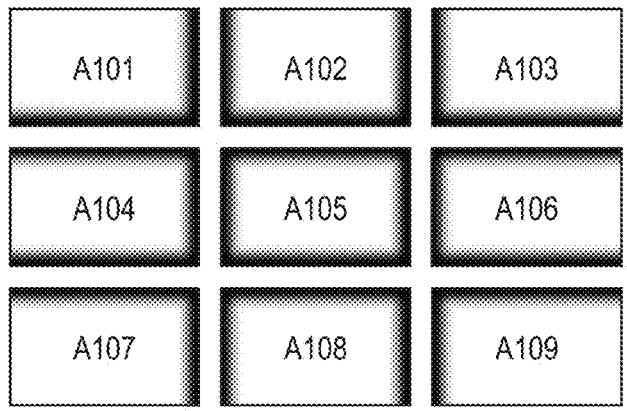
FIGS. 9A, 9B and 9C are diagrams for describing the controlling method of an image displaying system according to the fourth embodiment of the present invention.
Figure 9B:
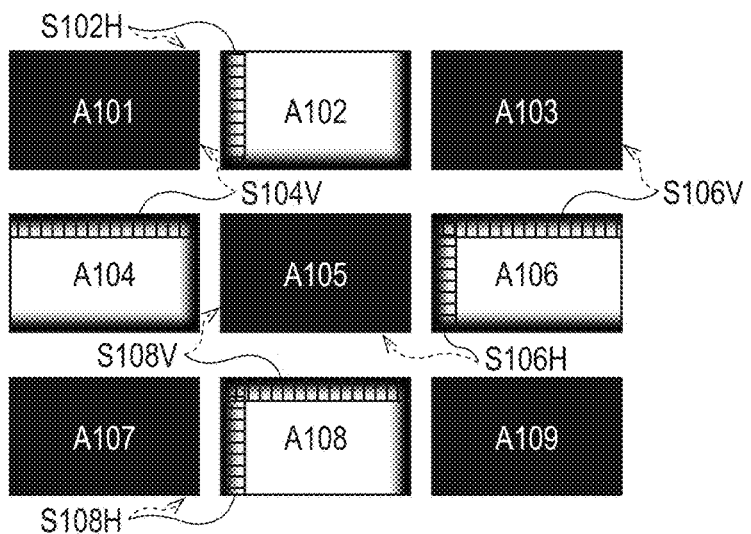

FIGS. 9A to 9B are diagrams for describing a controlling method of the image displaying system according to the fourth embodiment of the present invention. In the fourth embodiment, as illustrated in FIG. 9A, screens A101 to A109 are constituted in the screen 210 by the nine projection-type image displaying apparatuses 100 arranged in a matrix state having three screens in the lateral direction and three screens in the longitudinal direction.

Next, a processing procedure in the controlling method of the image displaying system according to the fourth embodiment will be described.

Figure 9C:
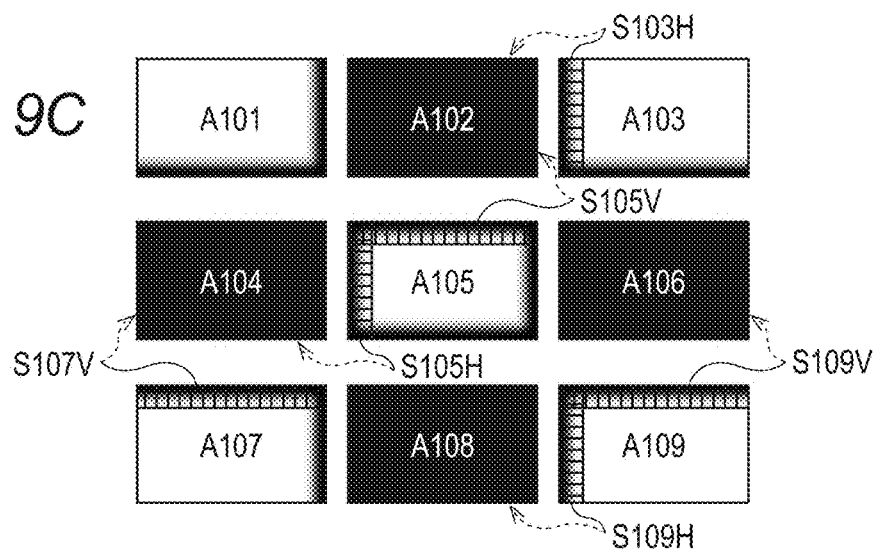
Figure 10:
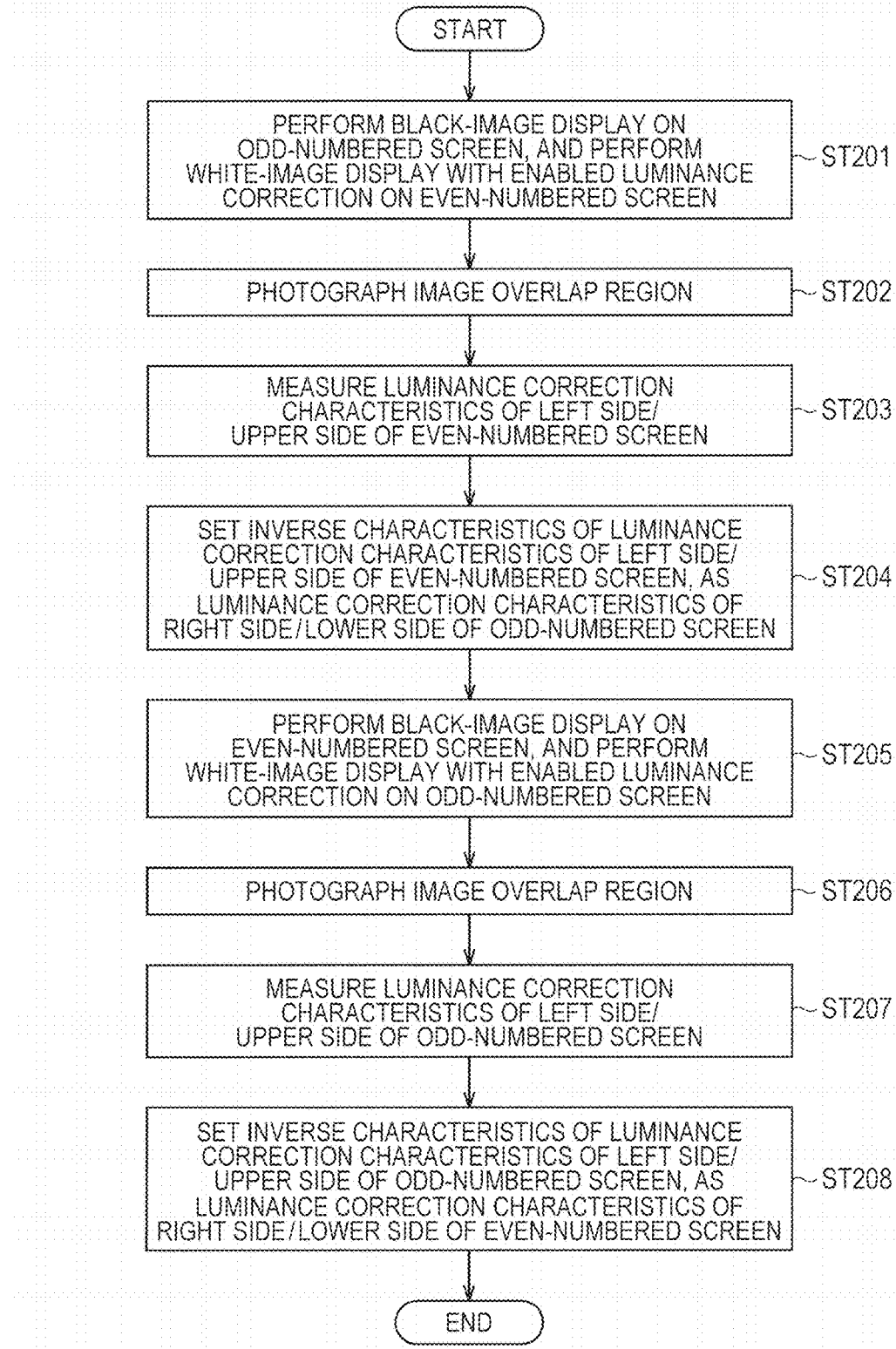
FIG. 10 is a flow chart for describing an example of the processing procedure in the controlling method of the image displaying system according to the fourth embodiment.
Figure 11A:
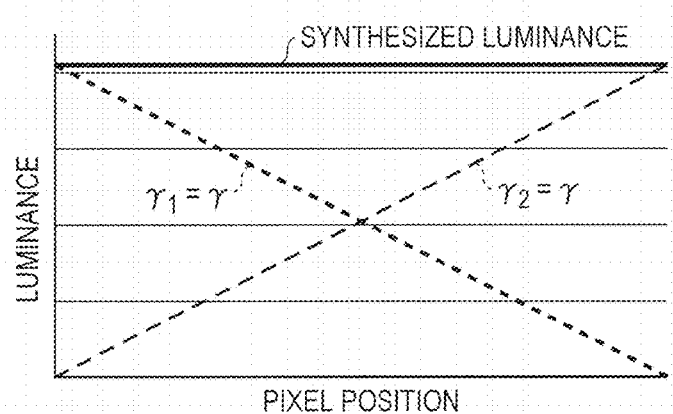
FIGS. 11A, 11B and 11C are diagrams for describing the luminance characteristics of an image overlap region.
Figure 11B:
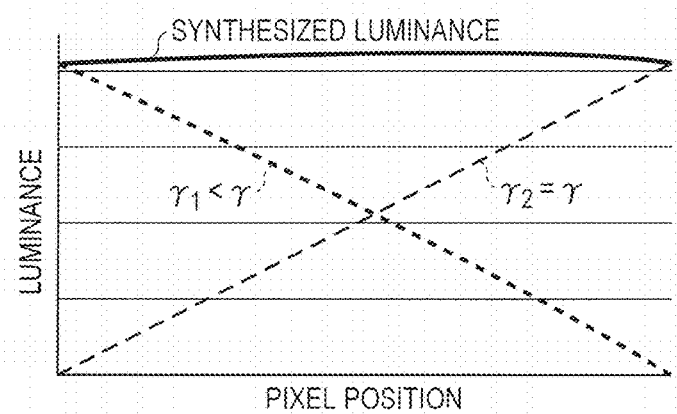
Figure 11C:
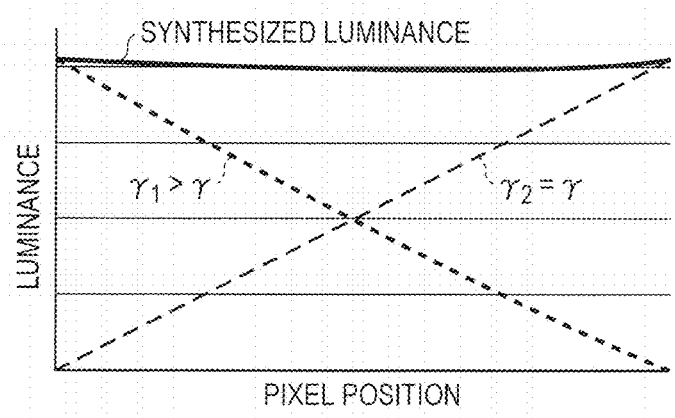

FIG. 10 is a flow chart for describing an example of the processing procedure in the controlling method of the image displaying system according to the fourth embodiment of the present invention. A flow chart in FIG. 10 will be described with reference to FIGS. 9A to 9C.

In steps ST201 to ST204 of FIG. 10, the projection-type image displaying apparatuses 100 which constitute odd-numbered screens (A101, A103, A105, A107 and A109) illustrated in FIG. 9A are treated as the luminance-correction projection-type image displaying apparatuses (the first projection-type image displaying apparatuses). The projection-type image displaying apparatuses 100 which constitute even-numbered screens (A102, A104, A106 and A108) illustrated in FIG. 9A are treated as the luminance-noncorrection projection-type image displaying apparatuses (the second projection-type image displaying apparatuses).

In the step ST201, the display controlling unit 231 performs a display control in which displays to the odd-numbered screens (A101, A103, A105, A107 and A109) of the projected images in the luminance-correction projection-type image displaying apparatuses 100 (the first projection-type image displaying apparatuses) are set as black-image displays. At the same time, the display controlling unit 231 performs a display control in which displays to the even-numbered screens (A102, A104, A106 and A108) of the projected images in the luminance-noncorrection projection-type image displaying apparatuses 100 (the second projection-type image displaying apparatuses) are set as white-image displays in which the luminance correction is enabled.

Specifically, in the step ST201 in FIG. 10, the odd-numbered screens (A101, A103, A105, A107 and A109) are set as the black-image displays (or the screens which are not displayed) as illustrated in FIG. 9B. And, as illustrated in FIG. 9B, the even-numbered screens (A102, A104, A106 and A108) are set as the white-image displays in which the luminance correction is enabled.

Subsequently, in the step ST202, the photography controlling unit 232 performs a photography control which makes the photographing apparatus 220 perform to photograph the image overlap regions by controlling the photographing apparatus 220. Here, the photographing of the image overlap regions may be separately performed for each of the image overlap regions. Or, the whole of the screen 210 is photographed and each of the image overlap regions may be separately cut out.

Subsequently, in the step ST203, the measuring unit 233 measures the luminance correction characteristics of the image overlap regions of the left and upper sides of the even-numbered screens, which are in a state of performing the luminance correction, on the basis of the photographed image obtained in the photographing apparatus 220 by the photography control of the step ST202. That is, the measuring unit 233 measures the luminance correction characteristics (the second luminance correction characteristics) of the image overlap regions of the projected images in the luminance-noncorrection projection-type image displaying apparatuses (the second projection-type image displaying apparatuses) 100.

Subsequently, in the step ST204, the setting unit 234 sets the luminance correction characteristics of the image overlap regions of the right and lower sides of the odd-numbered screens on the basis of the inverse characteristics in the luminance correction characteristics which were measured in the step ST203. That is, the luminance correction characteristics (the first luminance correction characteristics) of the image overlap regions of the right and lower sides of the projected images (that is, odd-numbered screens) in the luminance-correction projection-type image displaying apparatuses (the first projection-type image displaying apparatuses) 100 are set in the luminance-correction projection-type image displaying apparatuses 100. More specifically, the first luminance correction characteristics are stored into the LUTs 132 of the luminance-correction projection-type image displaying apparatuses 100 and set as luminance correction data (luminance correction coefficient).

Specifically, in the step ST204, as illustrated in FIG. 9B, an inverse characteristic in a luminance correction characteristic S102H of an image overlap region of the left side of the even-numbered screen A102 is set as a luminance correction characteristic of an image overlap region of the right side of the odd-numbered screen A101. Similarly, an inverse characteristic in a luminance correction characteristic S106H of an image overlap region of the left side of the even-numbered screen A106 is set as a luminance correction characteristic of an image overlap region of the right side of the odd-numbered screen A105. Similarly, an inverse characteristic in a luminance correction characteristic S108H of an image overlap region of the left side of the even-numbered screen A108 is set as a luminance correction characteristic of an image overlap region of the right side of the odd-numbered screen A107. In addition, specifically, in the step ST204, as illustrated in FIG. 9B, an inverse characteristic in a luminance correction characteristic S104V of an image overlap region of the upper side of the even-numbered screen A104 is set as a luminance correction characteristic of an image overlap region of the lower side of the odd-numbered screen A101. Similarly, an inverse characteristic in a luminance correction characteristic S106V of an image overlap region of the upper side of the even-numbered screen A106 is set as a luminance correction characteristic of an image overlap region of the lower side of the odd-numbered screen A103. Similarly, an inverse characteristic in a luminance correction characteristic S108V of an image overlap region of the upper side of the even-numbered screen A108 is set as a luminance correction characteristic of an image overlap region of the lower side of the odd-numbered screen A105.

Next, in steps ST205 to ST208 in FIG. 10, the projection-type image displaying apparatuses 100 which constitute the even-numbered screens (A102, A104, A106 and A108) illustrated in FIG. 9A are treated as the luminance-correction projection-type image displaying apparatuses (the first projection-type image displaying apparatuses). In addition, the projection-type image displaying apparatuses 100 which constitute the odd-numbered screens (A101, A103, A105, A107 and A109) illustrated in FIG. 9A are treated as the luminance-noncorrection projection-type image displaying apparatuses (the second projection-type image displaying apparatuses).

In the step ST205, the display controlling unit 231 performs a display control, in which displays to the even-numbered, screens (A102, A104, A106 and A108) of the projected images in the luminance-correction projection-type image displaying apparatuses (the first projection-type image displaying apparatuses) 100 are set as the black-image displays. At the same time, the display controlling unit 231 performs a display control, in which displays to the odd-numbered screens (A101, A103, A105, A107 and A109) of the projected images in the luminance-noncorrection projection-type image displaying apparatuses (the second projection-type image displaying apparatuses) 100 are set as the white-image displays in which the luminance correction is enabled.

Specifically, in the step ST205 in FIG. 10, the even-numbered screens (A102, A104, A106 and A108) are set as the black-image displays (or the screens which are not displayed) as illustrated in FIG. 9C. In addition, the odd-numbered screens (A101, A103, A105, A107 and A109) are set as the white-image displays, in which the luminance correction is enabled, as illustrated in FIG. 9C.

Subsequently, in the step ST206, the photography controlling unit 232 performs a photography control which makes the photographing apparatus 220 perform to photograph the image overlap regions by controlling the photographing apparatus 220. Here, the photographing of the image overlap regions may be separately performed for each of the image overlap regions. Or, the whole of the screen 210 is photographed and each of the image overlap regions may be separately cut out.

Subsequently, in the step ST207, the measuring unit 233 measures the luminance correction characteristics of the image overlap regions of the left and upper sides of the odd-numbered screens, which are in a state of performing the luminance correction, on the basis of the photographed image obtained in the photographing apparatus 220 by the photography control of the step ST206. That is, the measuring unit 233 measures the luminance correction characteristics (the second luminance correction characteristics) of the image overlap regions of the projected images in the luminance-noncorrection projection-type image displaying apparatuses (the second projection-type image displaying apparatuses) 100.

Subsequently, in the step ST208, the setting unit 234 sets the luminance correction characteristics of the right side and lower side image overlap regions of the odd-numbered screens on the basis of the inverse characteristics in the luminance correction characteristics which were measured in the step ST207. That is, the luminance correction characteristics (the first luminance correction characteristics) of the image overlap regions of the right and lower sides of the projected images (that is, odd-numbered screens) in the luminance-correction projection-type image displaying apparatuses (the first projection-type image displaying apparatuses) 100 are set in the luminance-correction projection-type image displaying apparatuses 100. More specifically, the first luminance correction characteristics are stored into the LUTs 132 of the luminance-correction projection-type image displaying apparatuses 100 and set as luminance correction data (luminance correction coefficient).

Specifically, in the step ST208, as illustrated in FIG. 9C, an inverse characteristic in a luminance correction characteristic S103H of an image overlap region the left side of the odd-numbered screen A103 is set as a luminance correction characteristic of an image overlap region of the right side of the even-numbered screen A102. Similarly, an inverse characteristic in a luminance correction characteristic S105H of an image overlap region of the left side of the odd-numbered screen A105 is set as a luminance correction characteristic of an image overlap region of the right side of the even-numbered screen A104. Similarly, an inverse characteristic in a luminance correction characteristic S109H of an image overlap region of the left side of the odd-numbered screen A109 is set as a luminance correction characteristic of an image overlap region of the right side of the even-numbered screen A108. In addition, specifically, in the step ST208, as illustrated in FIG. 9C, an inverse characteristic in a luminance correction characteristic S105V of an image overlap region of the upper side of the odd-numbered screen A105 is set as a luminance correction characteristic of an image overlap region of the lower side of the even-numbered screen A102. Similarly, an inverse characteristic in a luminance correction characteristic S107V an image overlap region of the upper side of the odd-numbered screen A107 is set as a luminance correction characteristic of an image overlap region of the lower side of the even-numbered screen A104. Similarly, an inverse characteristic in a luminance correction characteristic S109V of an image overlap region of the upper side of the odd-numbered screen A109 is set as a luminance correction characteristic of an image overlap region of the lower side of the even-numbered screen A106.

In the fourth embodiment, the luminance correction characteristics of the image overlap regions of the left and upper sides in the respective screens have been measured, and the inverse characteristics of the luminance correction characteristics have been set in these screens as the luminance correction characteristics of the image overlap regions of the right and lower sides in the screens in which the image overlap regions are overlapped with each other. The present invention is not limited to this configuration, but the first luminance correction characteristics may be set in the luminance-correction projection-type image displaying apparatuses for each the image overlap region of one of the left and right sides and for each the image overlap region of one of the upper and lower sides in the respective screens.

As described above, in the fourth embodiment, the first luminance correction characteristic is to be set in the luminance-correction projection-type image displaying apparatus for each the image overlap region of one of the left and right sides of the projected image and for each the image overlap region of one of the upper and lower sides of the projected image in the luminance-correction projection-type image displaying apparatus (the first projection-type image displaying apparatus). According to this configuration, the synthesized luminance in the image overlap region of the projected image can be unified by a simple process similar to an effect in the first embodiment. Further, according to the fourth embodiment, the luminance correcting process for the whole multi-view screen can be simplified.

Other Embodiments

Embodiment (s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Incidentally, the above-described embodiments of the present invention merely show the examples of concretization for carrying out the present invention, and the technical scope of the present invention should not be definitely interpreted by the above-described embodiments. That is, the present invention can be carried out in various ways without departing from its technical scope or its main characteristic.

According to the present invention, it is possible by the simple process to uniform the synthesized luminance in the image overlap region of the projected image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-248332, filed Dec. 8, 2014, which is hereby incorporated by reference herein in its entirety.

What is claimed is:

1. An image displaying system comprising:
  a first projector configured to project an image to a screen;
  a second projector configured to project an image to the screen;
  a memory storing instructions; and
  at least one hardware processor configured to implement the instructions stored in the memory and execute:
    a specifying task that specifies an overlap region on the screen where a first projection region on which an image is projected by the first projector and a second projection region on which an image is projected by the second projector overlap each other;
    a measuring task that measures, based on a photographed image of the specified overlap region on the screen photographed in a situation where the first projector is projecting a predetermined image that is not uniform in brightness, and the second projector is projecting no image or only a uniform image that is uniform in brightness onto the overlap region, brightness of each of measuring positions in the specified overlap region in the situation, wherein the predetermined image projected by the first projector has been corrected by first luminance correction for reducing brightness of an image to be projected from the first projector at different degrees for different positions in the specified overlap region;
    a setting task that sets, based on the brightness measured by the measuring task in the situation where the first projector is projecting the predetermined image that is not uniform in brightness and the second projector is projecting no image or only the uniform image that is uniform in brightness onto the overlap region, a parameter used for second luminance correction for reducing brightness of an image to be projected from the second projector at different degrees for different positions in the specified overlap region, to lessen a degree of the second luminance correction for a specific position, from among the measuring positions, in a first case where the measured brightness of the specific position is a first value, to less than the degree of the second luminance correction for the specific position, in a second case where the measured brightness of the specific position is a second value that is greater than the first value;
    a projecting task that causes the second projector to project a second image onto the screen together with the first projector projecting a first image onto the screen, wherein the first image is an image corrected by the first luminance correction and the second image is an image corrected by the second luminance correction according to the parameter set in the setting task; and
  a determining task that determines, based on another photographed image of the specified overlap region photographed in another situation where the second projector is projecting another predetermined image that is not uniform in brightness and the first projector is projecting no image or only a uniform image that is uniform in brightness onto the overlap region, a display characteristic of the second projector,
  wherein the setting task sets the parameter used by the second projector to perform the second luminance correction according to both the brightness measured by the measuring task and the display characteristic determined by the determining task.

2. A controlling apparatus comprising:
  a memory storing instructions; and
  at least one processor configured to implement the instructions stored in the memory and execute:
    a specifying task that specifies an overlap region on a screen where a first projection region on which an image is projected by a first projector and a second projection region on which an image is projected by a second projector overlap each other;
    a measuring task that measures, based on a photographed image of the specified overlap region on the screen photographed in a situation where the first projector is projecting a predetermined image that is not uniform in brightness and the second projector is projecting no image or only a uniform image that is uniform in brightness onto the overlap region, brightness of each of measuring positions in the specified overlap region in the situation, wherein the predetermined image projected by the first projector has been corrected by first luminance correction for reducing brightness of an image to be projected from the first projector at different degrees for different positions in the specified overlap region;
    a setting task that sets, based on the brightness measured by the measuring task in the situation where the first projector is projecting the predetermined image that is not uniform in brightness and the second projector is projecting no image or only the uniform image that is uniform in brightness onto the overlap region, a parameter used for second luminance correction for reducing brightness of an image to be projected from the second projector at different degrees for different positions in the specified overlap region, to lessen a degree of the second luminance correction for a specific position, from among the measuring positions, in a first case where the measured brightness of the specific position is a first value, to less than the degree of the second luminance correction for the specific position, in a second case where the measured brightness of the specific position is a second value that is greater than the first value;

a projecting task that causes the second projector to project a second image onto the screen together with the first projector projecting a first image onto the screen, wherein the first image is an image corrected by the first luminance correction and the second image is an image corrected by the second luminance correction according to the parameter set in the setting task; and a first determining task that determines, based on another photographed image of the specified overlap region photographed in another situation where the second projector is projecting another predetermined image that is not uniform in brightness and the first projector is projecting no image or only a uniform image that is uniform in brightness onto the overlap region, a display characteristic of the second projector, wherein the setting task sets the parameter used by the second projector to perform the second luminance correction according to both the brightness measured by the measuring task and the display characteristic determined by the first determining task.

3. The controlling apparatus according to claim 2, wherein the setting task sets parameters used by the second projector to perform the second luminance correction for one of left side part or right side part of the image and one of upper side part or lower side part of the image.

4. The controlling apparatus according to claim 2, wherein the predetermined image projected by the first projector is a white image corrected by the first luminance correction for reducing brightness of part of the white image corresponding to the specified overlap region with gradations.

5. The controlling apparatus according to claim 2, wherein the setting task sets a plurality of parameters, respectively corresponding to a plurality of colors, used by the second projector to perform the second luminance correction for reducing brightness, for each of the plurality of colors of the image to be projected to the specified overlap region.

6. A controlling method comprising:

a specifying step of specifying an overlap region on a screen where a first projection region on which an image is projected by a first projector and a second projection region on which an image projected by a second projector overlap each other;

a measuring step of measuring, based on a photographed image of the specified overlap region on the screen photographed in a situation where the first projector is projecting a predetermined image that is not uniform in brightness and the second projector is projecting no image or only a uniform image that is uniform in brightness onto the overlap region, brightness of each of measuring positions in the specified overlap region in the situation, wherein the predetermined image projected by the first projector has been corrected by first luminance correction for reducing brightness of an image to be projected from the first projector at different degrees for different positions in the specified overlap region;

a setting step of setting, based on the brightness measured by the measuring step in the situation where the first projector is projecting the predetermined image that is not uniform in brightness and the second projector is projecting no image or the uniform image that is uniform in brightness onto the overlap region, a parameter used for second luminance correction for reducing brightness of an image to be projected from the second projector at different degrees for different positions in the specified overlap region, to lessen a degree of the second luminance correction for a specific position, from among the measuring positions, in a first case where the measured brightness of the specific position is a first value, to less than the degree of the second luminance correction for the specific position, in a second case where the measured brightness of the specific position is a second value that is greater than the first value;

a projecting step of causing the second projector to project a second image onto the screen together with the first projector projecting a first image onto the screen, wherein the first image is an image corrected by the first luminance correction and the second image is an image corrected by the second luminance correction according to the parameter set in the setting step; and a determining step of determining, based on another photographed image of the specified overlap region photographed in another situation where the second projector is projecting another predetermined image that is not uniform in brightness and the first projector is projecting no image or only a uniform image that is uniform in brightness onto the overlap region, a display characteristic of the second projector, wherein the setting step sets the parameter used by the second projector to perform the second luminance correction according to both the brightness measured by the measuring step and the display characteristic determined in the determining step.

7. The method according to claim 6, wherein the setting step sets a plurality of parameters, respectively corresponding to a plurality of colors, used by the second projector to perform the second luminance correction for reducing brightness for each of the plurality of colors of the image to be projected to the specified overlap region.

8. A non-transitory computer-readable medium storing a program executable by a computer to execute a controlling method comprising:

a specifying step of specifying an overlap region on a screen where a first projection region on which an image is projected by a first projector and a second projection region on which an image is projected by a second projector overlap each other;

a measuring step of measuring, based on a photographed image of the specified overlap region on the screen photographed in a situation where the first projector is projecting a predetermined image that is not uniform in brightness and the second projector is projecting no image or a uniform image that is uniform in brightness onto the overlap region, brightness of each of measuring positions in the specified overlap region in the situation, wherein the predetermined image projected by the first projector has been corrected by first luminance correction for reducing brightness of an image to be projected from the first projector at different degrees for different positions in the specified overlap region;

a setting step of setting, based on the brightness measured by the measuring step in the situation where the first projector is projecting the predetermined image that is not uniform in brightness and the second projector is projecting no image or only the uniform image that is uniform in brightness on the overlap region, a parameter used for second luminance correction for reducing brightness of an image to be projected from the second projector at different degrees for different position in the specified overlap region, to lessen a degree of the second luminance correction for a specific position, from among the measuring positions, in a first case where the measured brightness of the specific position is a first value, to less than the degree of the second luminance correction for the specific position, in a second case where the measured brightness of the specific position is a second value that is greater than the first value;

a projecting step of causing the second projector to project a second image onto the screen together with the first projector projecting a first image onto the screen, wherein the first image is an image corrected by the first luminance correction and the second image is an image corrected by the second luminance correction according to the parameter set in the setting step; and a determining step of determining, based on another photographed image of the specified overlap region photographed in another situation where the second projector is projecting another predetermined image that is not uniform in brightness and the first projector is projecting no image or only a uniform image that is uniform in brightness onto the overlap region, a display characteristic of the second projector, wherein the setting step sets the parameter used by the second projector to perform the second luminance correction according to both the brightness measured by the measuring step and the display characteristic determined in the determining step.

9. The controlling apparatus according to claim 2, wherein the display characteristic of the second projector indicates relation between an input image signal to the second projector and brightness of an image projected by the second projector.

10. The controlling apparatus according to claim 2, wherein brightness of the uniform image projected by the second projector is less than brightness of the predetermined image projected by the first projector.

11. The controlling apparatus according to claim 2, wherein:

the processor is further configured to execute a second determining task that determines, based on the brightness measured by the measuring task in the situation, a characteristic of the first luminance correction for the first projector, and the setting task sets, based on the characteristic of the first luminance correction for the first projector determined by the second determining task, the parameter used by the second projector to perform the second luminance correction.

* * * * *